(12) United States Patent  
Nagwanshi et al.

(10) Patent No.: US 8,840,171 B2
(45) Date of Patent: Sep. 23, 2014

(54) PLASTICALLY DEFORMABLE COIL ENERGY ABSORBER SYSTEMS

(75) Inventors: Dhanendra Kumar Nagwanshi, Bangalore (IN); Sudhakar Ramamoorthy Marur, Bangalore (IN); Gerhard Zenz, Gaenserndorf (AT); Derek Buckmaster, Glen Iris (AU)

(73) Assignee: Sabic Innovative Plastics IP B.V. (NL)

( * ) Notice: Subject to any disclaimer, the term of this patent is extended or adjusted under 35 U.S.C. 154(b) by 113 days.

(21) Appl. No.: 13/449,599

(22) Filed: Apr. 18, 2012

(65) Prior Publication Data

US 2012/0200099 A1 Aug. 9, 2012

Related U.S. Application Data

(63) Continuation of application No. 12/724,962, filed on Mar. 16, 2010, now Pat. No. 8,182,023.

(51) Int. Cl.
*B60J 7/00* (2006.01)
*F16F 1/04* (2006.01)
*F16F 7/12* (2006.01)
*B60R 19/18* (2006.01)

(52) U.S. Cl.
CPC . *B60R 19/18* (2013.01); *F16F 1/04* (2013.01); *B60R 2019/186* (2013.01); *B60R 2019/1893* (2013.01); *F16F 7/12* (2013.01)
USPC .................................................. 296/187.09

(58) Field of Classification Search
USPC ............... 296/187.09; 293/132, 137, 136
See application file for complete search history.

(56) References Cited

U.S. PATENT DOCUMENTS

| | | | | |
|---|---|---|---|---|
| 1,530,017 A | * | 3/1925 | Kyriakos Souliotis | ....... 293/134 |
| 2,852,424 A | | 9/1958 | Reinhart et al. | |
| 2,913,240 A | | 11/1959 | Mohr | |

(Continued)

FOREIGN PATENT DOCUMENTS

| | | |
|---|---|---|
| DE | 19946352 A1 | 3/2001 |
| EP | 0909682 A2 | 4/1999 |

(Continued)

OTHER PUBLICATIONS

European Enhanced Vehicle-Safety Committee; EEVC Working Group 17 Report, "Improved Test Methods to Evaluate Pedestrian Protection Afforded by Passenger Cars"; Dec. 1998; Updated Sep. 2002; 98 Pages.

(Continued)

*Primary Examiner* — Kiran B Patel
(74) *Attorney, Agent, or Firm* — Cantor Colburn LLP

(57) ABSTRACT

In one embodiment, an energy management system can comprise: a vehicle energy management system comprises: a support structure selected from a bumper beam, a body in white, a body in black, a front-end module, a radiator support beam, a bumper support bracket, a component projecting from the body in white, a component projecting from the body in black, and combinations comprising at least one of the foregoing; a covering; and a coil energy absorber made of plastic. The coil energy absorber has an initial height and is located between the support structure and the covering. The coil energy absorber absorbs energy upon impact such that, after the impact, the coil energy absorber has a final height that is less than or equal to 90% of the initial height.

18 Claims, 9 Drawing Sheets

(56) References Cited

U.S. PATENT DOCUMENTS

| | | | |
|---|---|---|---|
| 2,969,971 A | 1/1961 | Nelson | |
| 3,081,992 A * | 3/1963 | Milton Kessler | 267/179 |
| 3,196,237 A | 7/1965 | Westgate, Jr. | |
| 3,254,787 A | 6/1966 | Braun | |
| 3,313,567 A * | 4/1967 | Sturman | 293/137 |
| 3,321,200 A | 5/1967 | Polhemus et al. | |
| 3,361,467 A * | 1/1968 | Ludwikowski | 293/136 |
| 3,393,012 A * | 7/1968 | Chancellor, Jr. | 5/654.1 |
| 3,422,547 A | 1/1969 | Heine | |
| 3,433,520 A * | 3/1969 | Steinmetz et al. | 293/137 |
| 3,576,040 A | 4/1971 | Larsen | |
| 3,627,179 A | 12/1971 | Scheindel | |
| 3,666,310 A | 5/1972 | Burgess et al. | |
| 3,731,638 A | 5/1973 | Tack | |
| 3,740,892 A | 6/1973 | Cox et al. | |
| 3,743,266 A | 7/1973 | Sturman et al. | |
| 3,744,814 A | 7/1973 | Sturman | |
| 3,749,274 A | 7/1973 | Mele et al. | |
| 3,754,690 A | 8/1973 | Marchant | |
| 3,756,643 A * | 9/1973 | Weed | 293/134 |
| 3,788,626 A * | 1/1974 | Isaacson | 267/202 |
| 3,798,783 A * | 3/1974 | Carella | 33/265 |
| 3,804,447 A | 4/1974 | Slavin | |
| 3,829,142 A * | 8/1974 | Bommarito | 293/134 |
| 3,833,248 A | 9/1974 | Wossner et al. | |
| 3,834,483 A * | 9/1974 | Palmer | 180/271 |
| 3,857,595 A | 12/1974 | Plegat | |
| 3,897,095 A | 7/1975 | Glance et al. | |
| 3,982,290 A | 9/1976 | Ward | |
| 3,997,208 A * | 12/1976 | Nomiyama | 293/102 |
| 4,036,042 A | 7/1977 | Kubota et al. | |
| 4,093,198 A * | 6/1978 | Petersen | 267/179 |
| 4,114,306 A * | 9/1978 | Molenaar | 446/486 |
| 4,141,530 A | 2/1979 | Ward | |
| 4,143,898 A * | 3/1979 | Klaus et al. | 293/137 |
| 4,254,978 A * | 3/1981 | Eshelman | 293/137 |
| 4,337,691 A * | 7/1982 | Tomaru | 92/138 |
| 4,380,483 A * | 4/1983 | Kliger | 156/169 |
| 4,437,611 A | 3/1984 | Gilroy | |
| 4,461,503 A * | 7/1984 | Melby | 293/118 |
| 4,524,974 A * | 6/1985 | Matsuura | 473/396 |
| 4,592,580 A * | 6/1986 | Stanganelli et al. | 293/136 |
| 4,598,820 A | 7/1986 | Murphy | |
| 4,660,250 A * | 4/1987 | Tillman et al. | 16/58 |
| 4,674,729 A | 6/1987 | Wallace | |
| 4,681,386 A | 7/1987 | Boulanger | |
| 4,685,712 A | 8/1987 | Wachowski et al. | |
| 4,688,778 A | 8/1987 | Woltron | |
| 4,744,530 A | 5/1988 | Cybulski et al. | |
| 4,754,689 A | 7/1988 | Grehl | |
| 4,762,352 A | 8/1988 | Enomoto | |
| 4,786,459 A * | 11/1988 | Mundo | 293/132 |
| 4,807,915 A * | 2/1989 | Shyi | 293/132 |
| 4,930,823 A * | 6/1990 | Rivera | 293/107 |
| 4,931,606 A * | 6/1990 | Bruner | 200/517 |
| 4,955,467 A | 9/1990 | Kallenbach | |
| 4,998,997 A | 3/1991 | Carlston | |
| 5,029,919 A * | 7/1991 | Bauer | 293/134 |
| 5,086,707 A | 2/1992 | Spencer et al. | |
| 5,116,092 A | 5/1992 | Schonleber | |
| 5,125,895 A * | 6/1992 | Buchbinder et al. | 604/95.01 |
| 5,181,699 A * | 1/1993 | Chang | 267/221 |
| 5,222,759 A | 6/1993 | Wanner et al. | |
| 5,370,429 A * | 12/1994 | Reuber et al. | 293/119 |
| 5,431,463 A * | 7/1995 | Chou | 293/110 |
| 5,593,195 A * | 1/1997 | Lei | 293/134 |
| 5,641,232 A * | 6/1997 | Frey | 401/11 |
| 5,669,647 A | 9/1997 | Neubauer | |
| 5,722,691 A | 3/1998 | Patel | |
| 5,772,190 A | 6/1998 | May et al. | |
| 5,820,205 A | 10/1998 | Ammons | |
| 5,927,696 A | 7/1999 | Hagemeister | |
| 5,952,631 A * | 9/1999 | Miyaki | 200/6 A |
| 5,984,285 A | 11/1999 | Konig et al. | |
| 6,004,492 A | 12/1999 | Lewit et al. | |
| 6,050,624 A * | 4/2000 | Kim | 293/132 |
| 6,053,930 A | 4/2000 | Ruppert | |
| 6,055,747 A | 5/2000 | Lombardino | |
| 6,058,607 A * | 5/2000 | Gringer | 30/162 |
| 6,062,764 A | 5/2000 | Rixen et al. | |
| 6,070,861 A | 6/2000 | Ecktman | |
| 6,082,792 A | 7/2000 | Evans et al. | |
| 6,099,055 A | 8/2000 | Hirota et al. | |
| 6,109,598 A | 8/2000 | Hilburger et al. | |
| 6,114,165 A | 9/2000 | Cai et al. | |
| 6,174,008 B1 * | 1/2001 | Kramer et al. | 293/118 |
| 6,179,356 B1 * | 1/2001 | Hartlieb et al. | 293/133 |
| 6,217,090 B1 * | 4/2001 | Berzinji | 293/132 |
| 6,223,954 B1 | 5/2001 | Carow | |
| 6,367,603 B1 | 4/2002 | Tiramani et al. | |
| 6,581,931 B1 | 6/2003 | Doepner et al. | |
| 6,637,789 B1 | 10/2003 | Imseis | |
| 6,658,671 B1 | 12/2003 | Von Holst et al. | |
| 6,739,577 B2 * | 5/2004 | Clancy et al. | 251/149.6 |
| 6,739,635 B2 * | 5/2004 | Byun | 293/135 |
| 6,838,965 B1 | 1/2005 | Von Gaisberg et al. | |
| 6,896,303 B1 | 5/2005 | Mohr | |
| 6,910,714 B2 * | 6/2005 | Browne et al. | 280/753 |
| 6,955,608 B1 | 10/2005 | Lutz | |
| 6,966,602 B2 | 11/2005 | Mae | |
| 7,029,044 B2 * | 4/2006 | Browne et al. | 293/137 |
| 7,044,515 B2 | 5/2006 | Mooijman et al. | |
| 7,061,723 B2 | 6/2006 | Price | |
| 7,097,222 B2 * | 8/2006 | Ran | 293/137 |
| 7,121,212 B2 | 10/2006 | Schorr et al. | |
| 7,121,612 B2 | 10/2006 | Rasmussen | |
| 7,121,613 B1 | 10/2006 | Rasmussen | |
| 7,503,602 B1 * | 3/2009 | Hinton | 293/124 |
| 7,568,746 B2 | 8/2009 | Jaarda et al. | |
| 7,648,467 B2 * | 1/2010 | Wang et al. | 600/573 |
| 7,871,343 B2 | 1/2011 | Blades | |
| 7,938,305 B2 | 5/2011 | Simonelli et al. | |
| 2002/0000543 A1 | 1/2002 | Arthur | |
| 2003/0075397 A1 | 4/2003 | Gravier | |
| 2003/0089562 A1 | 5/2003 | Gravier et al. | |
| 2003/0209915 A1 | 11/2003 | Yoshida | |
| 2003/0228920 A1 | 12/2003 | Heutschi et al. | |
| 2004/0016899 A1 * | 1/2004 | Clancy et al. | 251/149.6 |
| 2004/0048028 A1 | 3/2004 | Thomas et al. | |
| 2004/0099700 A1 | 5/2004 | Misumi | |
| 2004/0211797 A1 | 10/2004 | Landis et al. | |
| 2004/0221520 A1 | 11/2004 | Chiang | |
| 2005/0207059 A1 | 9/2005 | Cochrane | |
| 2005/0275154 A1 * | 12/2005 | Sonoda | 271/122 |
| 2006/0097558 A1 | 5/2006 | Aubert | |
| 2006/0178601 A1 * | 8/2006 | Wang et al. | 601/14 |
| 2007/0257854 A1 * | 11/2007 | Guo | 343/790 |
| 2007/0277425 A1 * | 12/2007 | Beck | 43/65 |
| 2008/0018167 A1 * | 1/2008 | Fuji | 301/5.23 |
| 2008/0121134 A1 | 5/2008 | Dunham | |
| 2010/0032970 A1 | 2/2010 | Nishiguchi et al. | |
| 2012/0025555 A1 | 2/2012 | Rasmussen | |
| 2012/0308339 A1 * | 12/2012 | McCabe | 414/13 |
| 2013/0154189 A1 * | 6/2013 | Fish | 273/243 |
| 2014/0058433 A1 * | 2/2014 | Barrett et al. | 606/198 |

FOREIGN PATENT DOCUMENTS

| | | |
|---|---|---|
| EP | 1842730 A1 | 10/2007 |
| FR | 380294 | 12/1907 |
| GB | 2193788 A | 2/1988 |
| GB | 2255038 A | 10/1992 |
| GB | 2283010 A | 4/1995 |
| JP | 5278540 A | 10/1993 |
| JP | 8026049 A | 1/1996 |
| JP | 08327809 A | 12/1996 |
| JP | 09150482 A | 6/1997 |
| JP | 10252793 A | 9/1998 |
| JP | 2000081505 A | 3/2000 |
| JP | 2001013309 A | 1/2001 |
| JP | 2002139610 A | 5/2002 |
| JP | 2004161109 A | 6/2004 |
| JP | 2008012942 A | 1/2008 |
| SU | 1162641 A | 6/1985 |

(56) References Cited

FOREIGN PATENT DOCUMENTS

| WO | 8807927 | A1 | 10/1988 |
|---|---|---|---|
| WO | 0242099 | A1 | 5/2002 |
| WO | 03022640 | A1 | 3/2003 |
| WO | 2008000394 | A1 | 1/2008 |

OTHER PUBLICATIONS

Japanese Patent No. 08327809 (A); Publication Date: Dec. 13, 1996; Abstract Only; 1 Page.
Japanese Patent No. 09150482 (A); Publication Date: Jun. 10, 1997; Abstract Only; 1 Page.
Japanese Patent No. 2000081505 (A); Publication Date: Mar. 21, 2000; Abstract Only; 1 Page.
Japanese Patent No. 2001013309 (A); Publication Date: Jan. 19, 2001; Abstract Only; 1 Page.
Japanese Patent No. 2002139610 (A); Publication Date: May 17, 2002; Abstract Only; 1 Page.
Japanese Patent No. 10252793 (A); Publication No: Sep. 22, 1998; Machine Translation; 5 Pages.
Russian Patent No. 1162641 (A1); Publication Date: Jun. 23, 1985; Machine Translation; 6 Pages.
German Patent No. 19946352 (A1); Publication Date: Mar. 29, 2001; Abstract Only; 1 Page.
Japanese Patent No. 2004161109 (A); Publication Date: Jun. 10, 2004; Abstract Only; 1 Page.
Japanese Patent No. 2008012942 (A); Publication Date: Jan. 24, 2008; Abstract Only; 1 Page.
French Patent No. 380294 (A); Publication Date: Dec. 4, 1907; Machine Translation; 5 Pages.
Japanese Patent No. 5278540 (A); Publication Date: Oct. 26, 1993; Abstract Only; 1 Page.
Japanese Patent No. 8026049 (A); Publication Date: Jan. 30, 1996; Abstract Only; 1 Page.
Allianz Zentrum fur Technik GmbH, Division of Automotive Engineering; "AZT-Procedure for Conducting a Low Speed 15 km/h Offset Insurance Crash Test to Determine the Damageability and Repairability Features of Motor Vehicles"; Jan. 7, 2009; 4 Pages.
D.K. Nagwanshi et al.; Light Weight Solitary Beam Design to Meet Low Speed Vehicle Damageability an RCAR Impact Requirements; 2008; 5 Pages.
International Search Report; International Application Number PCT/IB2011/051023; International Filing Date Mar. 10, 2011; Date of Mailing Aug. 29, 2011; 7 pages.
Written Opinion of the International Searching Authority; International Application No. PCT/IB2011/051023; International Filing Date Mar. 10, 2011; Date of Mailing Aug. 29, 2011; 7 pages.
Research Council for Automobile Repairs; News Release; "Low Speed Crash Testing"; Nov., 2003; 2 Pages.

* cited by examiner

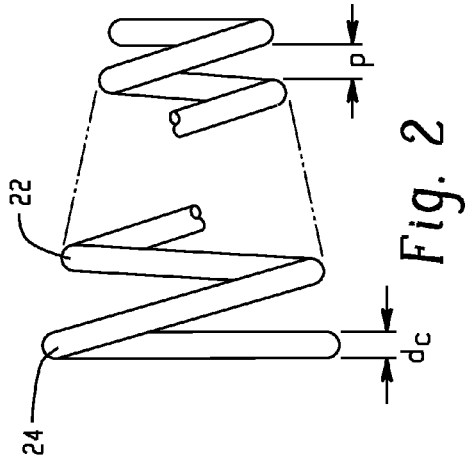
Fig. 1
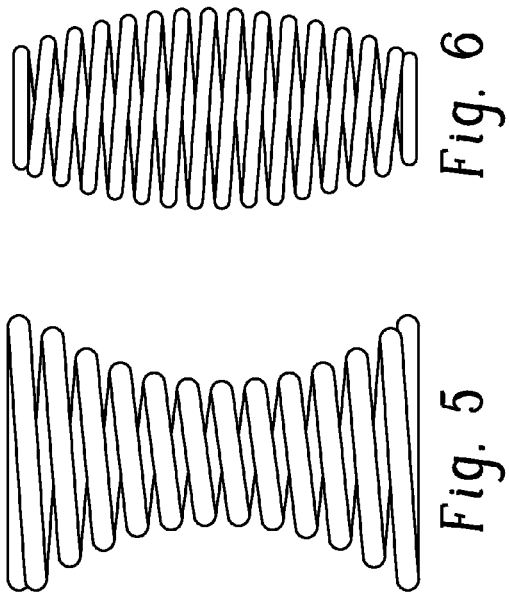
Fig. 2
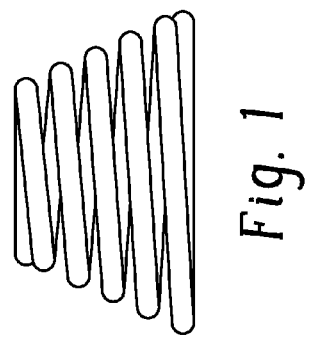
Fig. 4
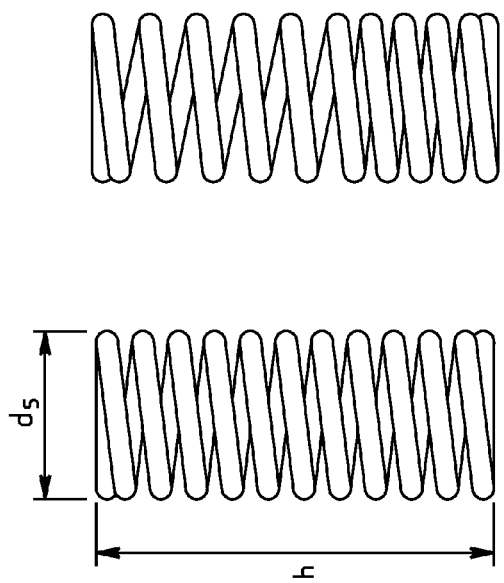
Fig. 3
Fig. 5
Fig. 6

PLASTICALLY DEFORMABLE COIL ENERGY ABSORBER SYSTEMS

CROSS REFERENCE TO RELATED APPLICATIONS

This application is a continuation of U.S. patent application Ser. No. 12/724,962, filed on Mar. 16, 2010, now U.S. Pat. No. 8,182,023, which is herein incorporated by reference in its entirety.

BACKGROUND

This disclosure relates to energy management systems for pedestrian safety and vehicle damageability, and especially relates to energy absorber systems that employ plastic deformation.

Increased importance has been placed on methods for minimizing the amount of injury suffered by a pedestrian when struck by a vehicle. Focus has been on bumper assemblies, headlamps. For bumper assemblies, foam resins have been used for energy absorption. Foam based systems typically have slow loading upon impact resulting in a high displacement. Further, while foams are effective to a sixty or seventy percent compression, beyond that point foams become incompressible such that the impact energy is not fully absorbed. The remaining impact energy is absorbed through deformation of a backup beam and/or vehicle structure. Foams are also temperature sensitive so that displacement and impact absorption behavior changes substantially with temperature. Typically, as temperature is lowered, the foam becomes more rigid, resulting in higher loads to attain displacement. Conversely, as temperature rises, foams become more compliant resulting in higher displacements and possible vehicle damage.

With respect to headlamps, actually, due to their placement at the front or the corners of the vehicle, the headlamps of the vehicle are one of the locations most contacted by a pedestrian in an impact, or damaged in an impact with another vehicle. Several different designs have been proposed for minimizing pedestrian injury during an impact as well as minimizing damage to headlamps (e.g., headlights). Some of them require significant structural modifications to the headlamp which increase its volume, weight, and/or cost. Others require structural modification to the chassis surrounding the headlamp area.

In the current competitive automotive market, a major challenge for a design engineer is to reduce component mass, thus reducing the system cost and increasing the fuel efficiency. At present, original equipment manufacturers (OEMs) are very aggressive regarding lower energy absorber mass as the available alternative system provides low cost and low mass solution but with a compromise in performance.

What is needed in the art are energy management systems that meet the desired impact targets at reduced mass (as compared with standard energy absorber systems currently on the market), and, where possible, reduce or simplify vehicle repairs.

BRIEF DESCRIPTION

The above-described drawbacks are alleviated by the present energy management system comprising springs that can deform plastically.

In one embodiment, an energy management system can comprise: a vehicle energy management system comprises: a support structure selected from a bumper beam, a body in white, a body in black, a front-end module, a radiator support beam, a bumper support bracket, a component projecting from the body in white, a component projecting from the body in black, and combinations comprising at least one of the foregoing; a covering; and a coil energy absorber made of plastic. The coil energy absorber has an initial height and is located between the support structure and the covering. The coil energy absorber absorbs energy upon impact such that, after the impact, the coil energy absorber has a final height that is less than or equal to 90% of the initial height.

In another embodiment, an energy management system can comprise: a vehicle energy management system comprises: a support structure selected from a bumper beam, a body in white, a body in black, a front-end module, a radiator support beam, a bumper support bracket, a component projecting from the body in white, a component projecting from the body in black, and combinations comprising at least one of the foregoing; a covering; and a coil energy absorber made of plastic. The vehicle energy management system meets EEVC WG17 Phase-II for upper leg impact and/or lower leg impact.

The above described and other features are exemplified by the following Figures and detailed description.

BRIEF DESCRIPTION OF THE DRAWINGS

Refer now to the drawings, which are exemplary, not limiting, and wherein like elements are numbered alike in several figures.

FIG. 1 is a side view of an embodiment of a compression coil spring comprising a conical geometry.

FIG. 2 is a side view of an embodiment of a coil spring comprising a conical geometry, illustrating the change in diameter of the spring.

FIG. 3 is a side view of an embodiment of a coil spring comprising a cylindrical geometry with a constant pitch.

FIG. 4 is a side view of an embodiment of a coil spring comprising a cylindrical geometry with a variable pitch.

FIG. 5 is a side view of an embodiment of a coil spring comprising an hourglass geometry.

FIG. 6 is a side view of an embodiment of a coil spring comprising a barrel geometry.

DETAILED DESCRIPTION

Figure 7:
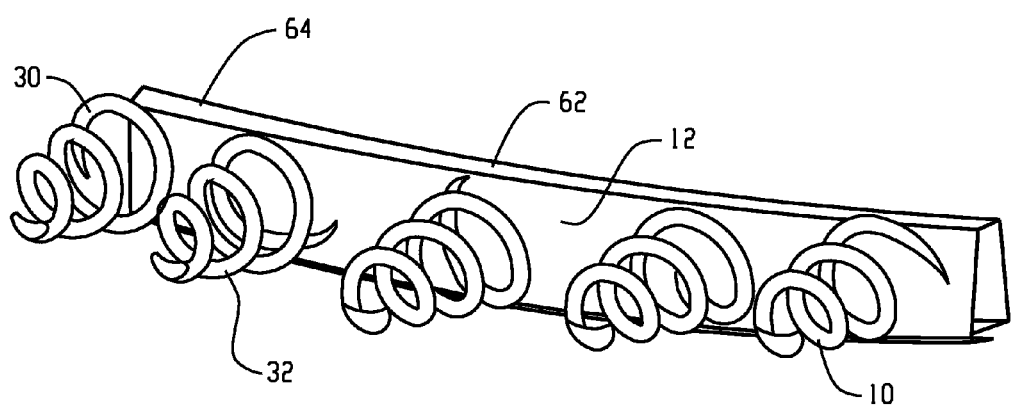
FIG. 7 is a prospective view of an embodiment of springs attached to an upper bumper beam.

Energy management systems comprising plastically deformable compression spring(s) can be used in various components within a vehicle system that can benefit from energy absorption. For example, plastic compression spring(s) can be employed in bumper assemblies, light assemblies (e.g., headlamp assemblies, rearlamp assemblies, interior lighting assemblies, and so forth), dashboard assemblies, hood restraint systems, fender assemblies, roof assemblies, door module assemblies and/or steering wheel assemblies. The plastically deformable compression spring(s) can provide energy absorption, which, under the desired degree of energy for a particular area, becomes plastic deformation. Such systems can enable directed tunability (e.g., stiffness at a specific location in a system, with different stiffness elsewhere), individual replacability (individual springs can be replaceable without requiring replacement of the entire component (e.g., replacement of a spring instead of the bumper assembly), reduced component weight, enable the bumper assemblies to meet or exceed pedestrian safety standards, and enhanced vibration stability of the bumper system.

In some embodiments, the plastically deformable compression springs can be employed as energy absorbers for automotive bumper assemblies. Such assemblies offer improved pedestrian safety with respect to lower leg model testing, upper leg model testing, and knee acceleration modeling, in addition to a reduced system cost by significantly reducing the mass of the component, e.g., by up to 25%. The reduced mass of the energy absorbers additionally aids in providing higher fuel efficiency by reducing the overall mass of a vehicle. The present system employs a plurality of plastically deformable springs across the bumper of a vehicle. The amount of energy required to compress the springs can be tuned (e.g., chosen), based upon several factors such as the type of vehicle, governmental regulations/requirements, the location along the bumper where the spring is located (i.e., each spring can have the same or different compression characteristics than another spring in the bumper). In other words, the bumper can be customized For example, the energy absorbers disclosed herein meet the requirements of the lower leg impact phase-2 targets with a 20% safety margin and also meet the requirements of the upper leg impact phase-2 regulations.

A great advantage of this system is that customization can be attained even without multiple types of tooling or equipment. The general design of every bumper assembly can be similar, e.g., with a fascia (e.g., outermost portion of the bumper assembly), springs, and a backing element (e.g., support structure). The difference between the systems can be the specific springs employed. The springs can also be removably attached, e.g., demountable, (i.e., can be removed and reattached to the element to which they are attached, without damaging said element) to the vehicle (e.g., to the fascia, to a bumper beam, to the body in white (BIW), to the body in black (BIB), bumper beam, a front-end module, a radiator support beam, bumper support brackets, a component projecting from the BIW, a component projecting from the BIB, and combinations comprising at least one of the foregoing), enabling facile replacement of a spent spring e.g., after a collision. For example, the spring(s) can have a threaded portion enabling them to be threaded into the appropriate element of the bumper system which will comprise the corresponding female component with mating internal threads. Other possible attachments include an opening into or through the particular element wherein an end of the coil passes into or through the opening and is retained therein, as well as fasteners described below in relation to fastening to the fascia.

Multiple springs (i.e., a set or a plurality of springs) can be placed over the full span of the vehicle to meet the performance targets of pedestrian safety, and/or to enhance vehicle integrity and/or component longevity. In other words, it is envisioned that the springs can be used in the front bumper system, the rear bumper system, and/or within various elements of the vehicle (e.g., in the head lamps, fender assemblies, hood restraint system, dash board assemblies, door module assemblies and roof assemblies).

A further advantage of the spring bumper system is that the replacement of a continuous shell-wall structured energy absorber with a set of tuned springs can reduce the system mass by greater than or equal to about 25%, the raw material cost by greater than or equal to about 30%, the tooling cost by greater than or equal to about 30%, and can lower the replacement cost for the overall bumper beam assembly if damaged. These energy absorbers can also enhance the vibration stability of the bumper fascia by absorbing vibration and/or force applied to the bumper fascia.

As is noted above, the energy absorber system can comprise a fascia, coil springs (e.g., various geometry compression springs, also referred to as helical springs) that offers flexibility to tune for a desired degree of plastic deformation during the impact; e.g., full plastic deformation, partial plastic deformation. The desired degree of plastic deformation is dependent upon various factors such as the impact condition (e.g., to reduce pedestrian injury, to reduce occupant injury, to reduce vehicle damage, etc.), the location on the vehicle of the energy absorber system, the type of vehicle, regulatory requirements, and others. Generally, the springs are designed to have a plastic deformation of greater than or equal to 10%, specifically, greater than or equal to 15%, and more specifically, greater than or equal to 20%. In some embodiments, the plastic deformation can be 10% to 50%, specifically, 15% to 45%, and more specifically, 15% to 40%. In some embodiments, the plastic deformation can be greater than or equal to 45%, specifically, greater than or equal to 50%, more specifically, 50% to 100%, yet more specifically 60% to 100%, and even more specifically, 75% to 100%. Here, the percent of plastic deformation is understood to be determined according to the following formula:

$$h_f = h_i - (\%p_d)(h_i)$$

wherein:

$P_d$=plastic deformation
$h_f$=final height ("h") of the spring after the impact
$h_i$=initial height ("h") of the spring before the impact For example, for impact conditions where human body is involved, (e.g., leg impact to vehicle bumper, or head impact over instrument panel or fender), a greater degree of plastic deformation is desired to absorb more energy than to redirect the energy at the body, higher plastic deformation (greater than or equal to 50% plastic deformation of the coils is desired). In other words, for a spring having a height ("h") of 100 millimeters (mm), if the spring is designed for pedestrian injury, upon an impact, the spring would plastically deform greater than or equal to 50%. Therefore, the height of the spring would decrease by greater than or equal to 50%. After the impact the spring height would be less than or equal to 50 mm. For the impact condition where the objective is to minimize damage to vehicle components, such as during low speed crashes, lower plastic deformation is generally desirable, e.g., a plastic deformation of greater than or equal to 15%, specifically, 15% to 40%. For example, if the energy absorber system is designed to reduce vehicle damage, for a spring having a height of 100 mm, for a low speed crash (e.g., less than or equal to 16 kilometers per hour (km/hr) (10 miles/hour)), after the accident, the spring height would be 60 mm to 85 mm.

Metal springs absorb the energy of impact and then release the energy by exerting a force opposite to the force received; they spring back, thereby transferring the energy to the element struck (e.g., the pedestrian). As a result, metal springs have not been used in front of bumper beams (e.g., have not been employed directly behind a fascia). These plastic springs, however, deform elastically, but also plastically (e.g., greater than or equal to 10% plastic deformation as described above), thereby tuning (e.g., controlling) the amount of energy released back toward the impact subject. Plastic springs dissipate the energy received instead of only projecting the energy back at the object impacted. They elastically and plastically deform. Hence, a bumper system has thermoplastic springs (e.g., wholly thermoplastic spring), or a combination of thermoplastic and non-thermoplastic springs (e.g., springs comprising thermoplastic coil(s) and non-thermoplastic coil(s), springs comprising a core and a coating, wherein at least one of the core and the coating is a non-thermoplastic material while the other is a thermoplastic material). Possible non-thermoplastic materials include thermoset material, metal, ceramic, and a combination comprising at least one of the foregoing non-thermoplastic materials. These springs can be employed anywhere in the vehicle system without concern for the energy release by the spring.

For example, to provide a controlled and energy efficient management for lower leg and/or upper leg impact, the bumper (e.g., the front of the bumper) can have a tuned stiffness profile (e.g., a different stiffness in different locations to attain a desired energy absorption upon impact). In one embodiment, the springs can be tuned locally to meet the performance targets (e.g., near the middle portion of the bumper assembly versus near the ends of the bumper assembly). For example, the springs can be tuned to have a stiffness of 0.01 kiloNewton per millimeter (kN/mm) to 10 kN/mm. Optionally, the springs can have a stiffness gradient from the middle of the bumper assembly toward the ends of the bumper assembly, with a higher stiffness toward the ends of the bumper beam (e.g., enabling a greater energy absorption in a smaller space).

The compression springs can have various geometries. Some geometries are illustrated in FIGS. 1-6, including conical (FIGS. 1 and 2), cylindrical (FIGS. 3 and 4, hourglass (FIG. 5), barrel (FIG. 6). These springs can have a constant or variable pitch (e.g., see FIGS. 3 and 4, respectively). The springs can be tuned during formation to meet the performance targets. In still another embodiment, the springs can be tuned after formation but prior to assembly to meet the performance targets. The geometric parameters of springs like, length, coil diameter, wire diameter, pitch can be tuned for different stiffness, during formation. After formation of springs, their layout over support structure can be configured to achieve different stiffness profiles.

The stiffness of each spring can be further tuned by varying the diameter and/or the pitch (i.e., the angle or degree of inclination) of the coils. FIG. 2 illustrates the coil diameter ($d_c$). The stiffness can be tuned by increasing or decreasing the diameter of the coils, wherein an increase in diameter also increases the stiffness. For example, the coil diameter ($d_c$) is dependent upon the desired stiffness, the distance that will be used between springs, the height of the springs, as well as other factors. In some embodiments, the coil diameter ($d_c$) can be 10 mm to 20 mm.

With respect to the spring diameter, the desired diameter is partially depending upon the shape of the spring (e.g., conical, cylindrical, barrel, etc.). For a conical spring, in some embodiments, the smallest diameter end can have a diameter that is less than or equal to 50% of the largest diameter end, specifically, less than or equal to 35% of the largest diameter end, more specifically, less than or equal to 25% of the largest diameter end, and yet more specifically, less than or equal to 20% of the largest diameter end. For example, the largest diameter end can have a diameter of 70 mm to 90 mm (e.g., 80 mm), while the smallest diameter end can have a diameter of 10 mm to 20 mm (e.g., 15 mm) In various embodiments, the pitch can be 10 mm to 60 mm, specifically, 15 mm to 40 mm, and more specifically, 20 mm to 30 mm.

Desirably, the materials of the springs are chosen to attain the desired plastic and elastic deformation. In some embodiments, the plastic springs can be totally thermoplastic (wherein "totally" means that there are no non-thermoplastics added thereto, but impurities may be present), or the springs can comprise plastic and another material. For example, the plastic coil may comprise a metal core (e.g., a thin metal wire coated in plastic), wherein the plastic deformation is provided by the plastic casing.

The spring can comprise any material(s) having the desired characteristics for the particular application (e.g., desired stiffness and plastic deformation) of the springs in the vehicle. With geometric limitations such as length and diameter of the spring, the desired stiffness of spring for different impact requirements can be achieved by selecting different material(s). Exemplary characteristics of the material include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. The springs can comprise a non-metallic material that is capable of plastic deformation (e.g., a plastically deformable non-metallic portion and a metallic portion). Exemplary spring materials include polycarbonate, polyester (e.g., polybutylene terephthalate ("PBT"), polyethylene terephthalate ("PET"), and others), as well as combinations comprising at least one of the foregoing materials. For example, the spring can comprise XENOY™ resin(s) which is commercially available from SABIC Innovative Plastics. In some embodiments, the plastic material can be a thermoplastic material that is flexible at temperatures of −60° C. to 200° C. For example, unfilled thermoplastic materials can have a tensile strength of 0.5 gigaPascals (GPa) to 2.8 GPa, a yield of 5 megaPascals (MPa) to 70 MPa, and/or an elongation of 10% to 150%; and filled thermoplastic materials can have a tensile strength of 1.5 GPa to 10 GPa, and/or an elongation of 0.5% to 10%; while composite materials (e.g., laminates) can have a tensile strength of 80 GPa to 160 GPa, and/or a shear modulus of 70 MPa to 100 MPa. For example, blends of polycarbonate/polybutylene terephthalate (e.g., a particular XENOY™ resin, commercially available from SABIC Innovative Plastics IP B.V.) can be employed, having a tensile strength of 1.87 GPa, a yield of 48 MPa, and an elongation of 120%.

Exemplary thermoplastics include polycarbonate, polybutylene terephalate, polypropylene, acrylonitrile-butadiene-styrene (ABS), acrylic-styrene-acrylonitrile (ASA), polyester (e.g., PBT, PET), polyamides, polyethylene (e.g., low density polyethylene (LDPE), high density polyethylene (HDPE)), polyamides, phenylene sulfide resins, polyvinyl chloride (PVC), polystyrene (e.g., high impact polystyrene (HIPS)), polypropylene (PP), polyphenylene ether resins, and thermoplastic olefins (TPO), and combinations comprising at least one of the foregoing. Some additional examples of plastic materials that can be used for the springs include, but are not limited to, polycarbonate/ABS blends, a copolycarbonate-polyester, acrylonitrile-(ethylene-polypropylene diamine modified)-styrene (AES), polyphenylene oxide and polystyrene (e.g., glass filled blends of polyphenylene oxide and polystyrene), blends of polyphenylene ether/polyamide, blends of polycarbonate/polyethylene terephthalate (PET)/polybutylene terephthalate (PBT), blends of polycarbonate/polybutylene terephthalate, polyethylene and fiber composites, polypropylene and fiber composites, long fiber reinforced thermoplastics, and combinations comprising at least one of the foregoing plastic materials. Commercially available materials include LEXAN™ resins, LEXAN™ EXL resins, XENOY™ resins, NORYL GTX™ resins, NORYL™ resins, and VERTON™ resins commercially available from SABIC Innovative Plastics, as well as AZDEL Superlite™ sheets commercially available from AZDEL, Inc. Optionally, e.g., to further enhance tuning of the overall bumper assembly, different springs in the energy absorber system can comprise the same or a different material(s).

Turning now to FIGS. 1 through 6, different embodiments of the springs described herein are illustrated. FIGS. 1 and 2 illustrate an embodiment where the springs are of a helical, conical shape, while FIG. 3 illustrates a constant pitch, cylindrical shaped spring, FIG. 4 illustrates a variable pitch, cylindrical shaped spring, FIG. 5 illustrates an hourglass shaped spring, and FIG. 6 illustrates a barrel shaped spring. The springs comprise a coil diameter ($d_c$), a spring diameter ($d_s$), a height (h), and a pitch (p). These features are illustrated in FIGS. 2 and 3. In some embodiments, as illustrated in FIG. 2, the coil spring can have a conical geometry featuring a first coil (22) adjacent to a second coil (24) where the first coil (22) has an outer diameter that is less than or equal to an inner diameter of the second coil (24). In one embodiment, the spring (10) is configured to plastically deform upon the application of energy to the fascia (16) (i.e., the spring deforms upon impact and does not return to its original shape after the impact is finished). As can be seen in FIGS. 1-6, the interior of the spring can be open; a void. Optionally, the interior can comprise a material or component that can assist in retaining the spring in its compressed position.

Figure 8:
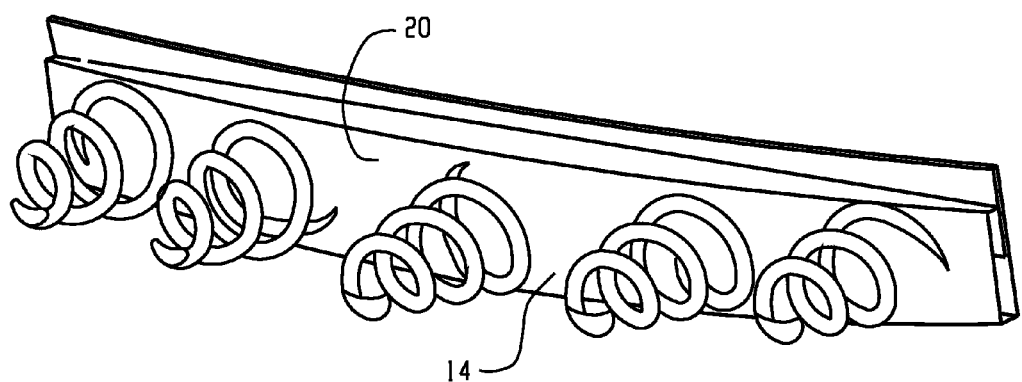
FIG. 8 is a prospective view of an embodiment of springs attached to a lower bumper beam.
Figure 9:
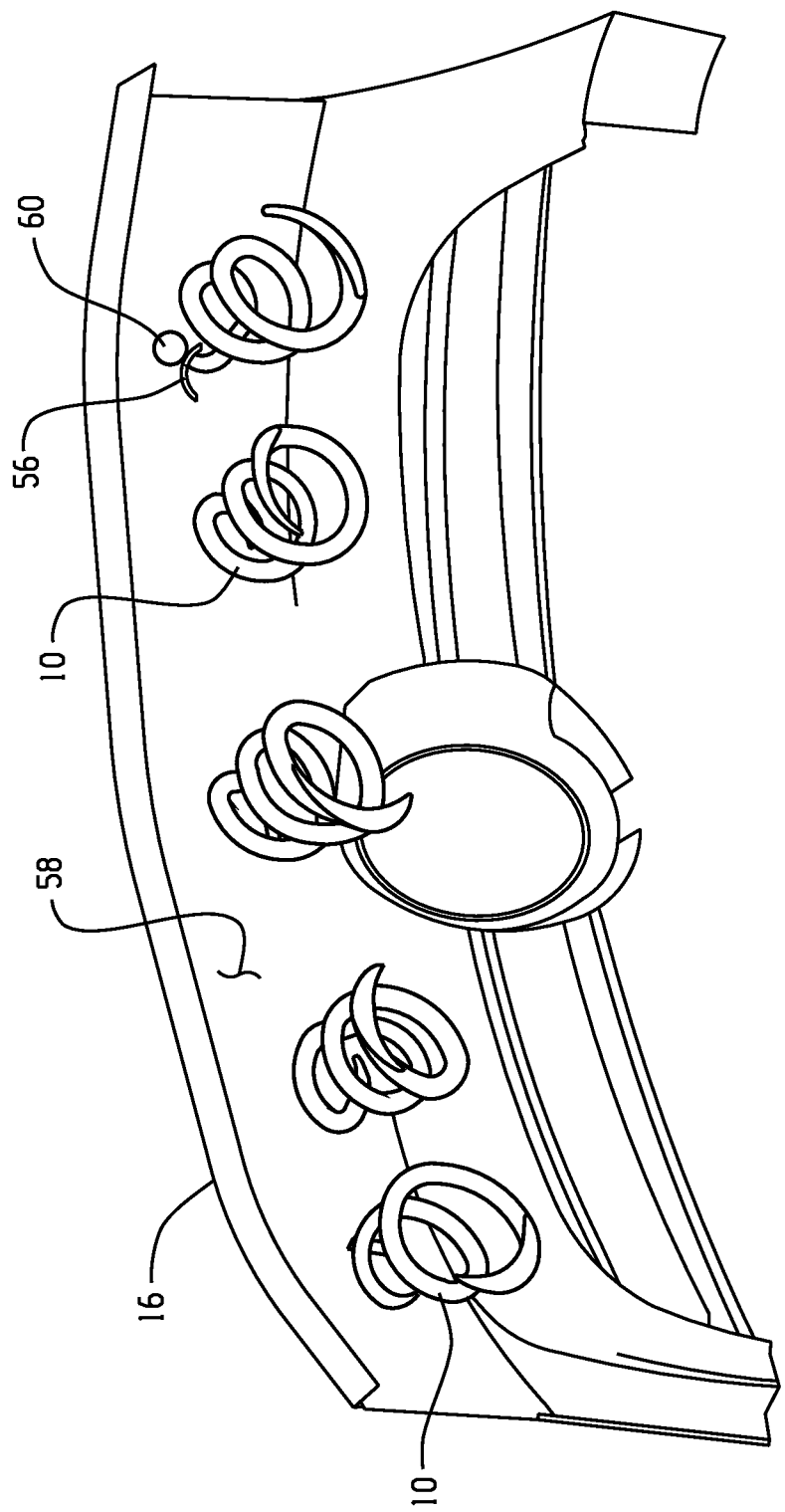
FIG. 9 is a prospective view of an embodiment of the back of a vehicle grill, with the springs attached to the covering (e.g., fascia).

Turning now to FIGS. 7 through 9, a plurality of springs (10) are shown where the springs (10) are attached to a support structure (12, 14). The support structure (12, 14) can comprise an upper bumper beam (12) and a lower bumper beam (14). FIGS. 7 and 8 illustrate an embodiment where the coil spring (10) has a conical geometry where inner and outer diameters of the coils gradually increase as the coils get closer to the support structure (12, 14) (i.e., the spring has a conical geometry that diverges toward the support structure). FIG. 7 illustrates an embodiment where a first portion of the plurality of coil springs (26) are located on the upper beam portion (12) and a second portion of the plurality of coil springs (28) are located on the lower beam portion (14).

In one embodiment, as shown in FIG. 8, the support structure (14) comprises a steel beam component (20). The support structure (12, 14) can comprise a component located on a front portion of a vehicle (e.g., a component having sufficient stiffness to support a desired compression of the springs upon a predetermined impact). The component (e.g., "stiff component") can be selected from the group consisting of a bumper beam (e.g., a steel bumper beam), a front end module (e.g., a component located behind a front bumper assembly), a radiator support beam, bumper support brackets, a component projecting from body in white, as well as combinations comprising at least one of the foregoing. Generally the support structure is the body in white (BIW) and/or a component attached to the BIW. In various embodiments, the support structure (12, 14) can be chosen and/or designed to have sufficient structural integrity to enable the coil spring to fully compress.

FIGS. 7 and 8 illustrate a plurality of coil springs (10) designed over the full length of the vehicle bumper (front and/or rear) where the springs (10) are tuned locally to meet the desired performance targets. In one embodiment, the desired stiffness as estimated from a lumped parameter model (e.g., a model that uses spring, mass, and dampers) can be achieved with greater than or equal to 5 springs (10). The springs (10) can be located between the fascia and the BIW, and can be attached to (e.g., located on, mounted or connected to) the fascia, the bumper beam (and/or another support structure located between the spring and the BIW), as well as any combination thereof. The springs (10) can be arranged such that a first spring (30) is parallel to a second spring (32). In one embodiment, the springs (10) can be located on a plate (e.g., a rigid plate, i.e., a plate that does not deform during the impact and transfer maximum load to spring for compression) for uniform load distribution where the plate is attached to a support member located on the front or the rear of the vehicle where the bumper assembly is attached.

In some embodiments, the number of springs (10) in the bumper assembly can be greater than or equal to 7, specifically, greater than or equal to 10, more specifically, greater than or equal to 20, and yet more specifically, greater than or equal to 25. In still other embodiments, the number of springs (10) in the bumper assembly can be 1 to 20, specifically, 3 to 15, more specifically 5 to 10, and yet more specifically, 5 to 7. As noted, the springs can be aligned along the support element and/or fascia in a row (e.g., straight row), or can be staggered. Also, more than one row of springs can be disposed between the fascia and the support element (e.g., the multistage spring absorber illustrated in FIG. 15), wherein a support structure can be located between the rows of springs in order to enable the springs to compress as desired.

FIG. 9 illustrates an embodiment of the back of a vehicle grill where springs (10) are attached to a fascia (16). The fascia (16) is a decorative element of the bumper assembly that covers or encloses the springs (10) and other components of the bumper assembly. As is illustrated in this figure, in some embodiments, the springs (10) can attach to the fascia (16) as opposed to other elements of the bumper assembly, or in addition to other element(s) of the bumper assembly. If the springs (10) attach to the fascia (16), the fascia can comprise fascia securement(s) (56) such as hook(s), slot(s), fixture(s), clamp(s), clip(s), screw(s) and bolt(s), U-clamp(s), as well as other fastener(s), and the like, e.g., on an inner surface (58) of the fascia (16). For example, an end of the spring (10) can be disposed through the fascia securement (56) and can be configured to inhibit inadvertent withdrawal from the fascia securement (56). Withdrawal can be inhibited in various fashions, including, for example, a hook, bend, enlarged portion, or element (60) near the end of the spring (10) that prevents withdrawal of the spring (10) from the fascia securement (56). For example, the fascia securement can be disposed through a hole (e.g., a ring) located near the end of the spring. The fascia securements (as well as other elements for attaching the springs to the vehicle), can be designed to enable the removal and replacement of individual springs, i.e., without requiring replacement of the element to which the spring is attached.

Figure 10:
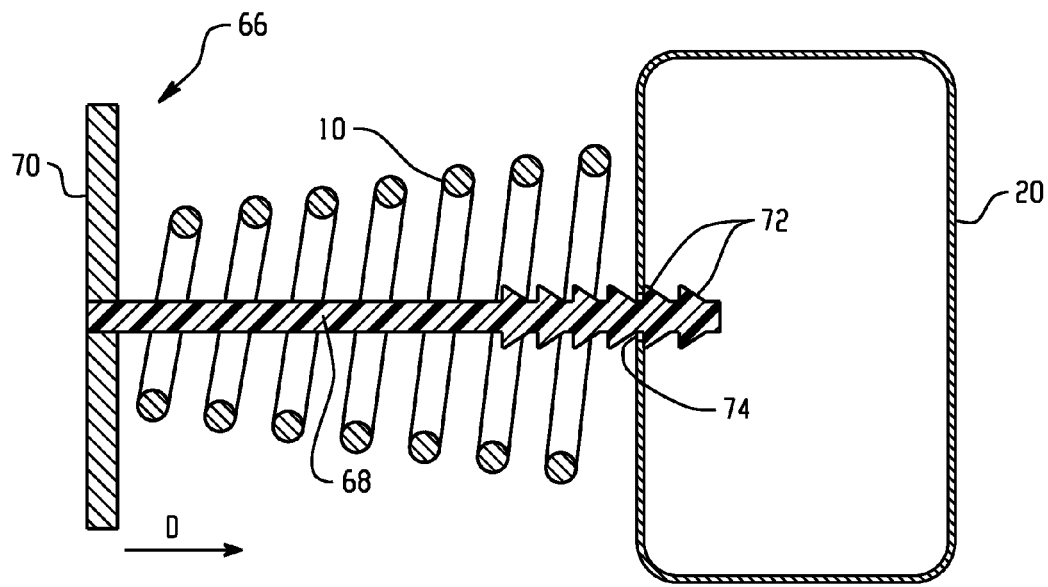
FIG. 10 is a prospective view of an embodiment of a spring comprising a plastic deformation element.
Figure 11:
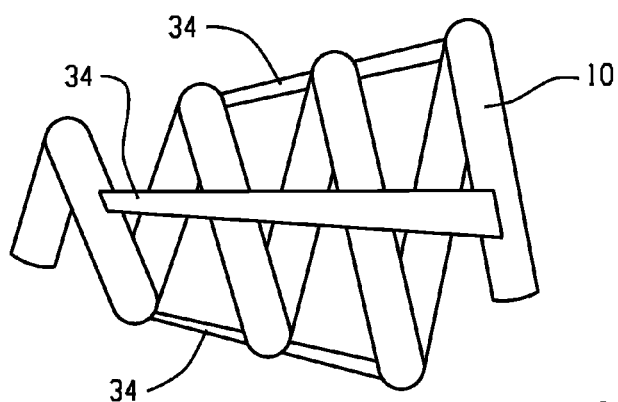
FIG. 11 is a side view of one embodiment of a spring comprising locking elements, wherein the spring is in the open position.
Figure 12:
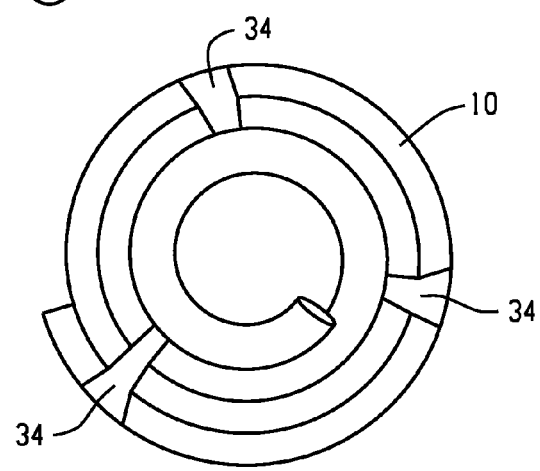
FIG. 12 is a top view of the spring of FIG. 11 in the compressed position and with the locking elements plastically deformed.

In some embodiments as illustrated in FIGS. 10-12, locking mechanism(s) can be employed in conjunction with one or more of the springs. Some possible locking mechanism(s) include a locking element (66) that, once compressed retains the spring in the compressed position. Illustrated is an arm (68) in operational engagement with the support element (e.g., bumper beam (20)). At or near one end of the arm 68 is a plate or restrainer (70), while the portion of the arm extending through the spring (10) and into the support element (20) comprises protrusion(s) (72) (e.g., snap-fit elements, barbs) that allow the arm (68) to move in a direction "D" upon the application of a force to plate (70). As the arm (68) moves in direction "D", toward the support element (20), the protrusions (72) pass through an opening (74), in the support element (20), wherein the protrusions (72) are sized and designed to allow passage through the opening (74) in the "D" direction, and to inhibit the passage of the protrusions (72) back through the opening (74) in the opposite direction. In other words, when a sufficient force pushes the plate (70) toward the support element (20) and to force protrusions (72) through the opening (74), the locking element (66) then retains the spring (10) in the compressed (or partially compressed) position.

FIGS. 11 and 12 illustrate additional locking elements that can be used alone or in conjunction with the element of FIG. 10. In these Figures, a plastic element (e.g., a plastic sheet (34)) is in operational communication (e.g., connected to) with the coils of the spring (10). During compression and energy absorption, the plastic sheet (34) serves to absorb some of the energy, causing the sheet(s) (34) to plastically deform. The plastic deformation of the sheet(s) further locks the coils in the compressed position, thus preventing the coils from springing back into their original position and expressing the force back outward. For example, during impact, the sheet (34) can experience all plastic deformation rather than elastic deformation, while the spring (10) can experience both plastic and elastic deformation.

The plastic element can be formed of the same or a different material as the spring. For example, the plastic element can be formed from thermoplastic (e.g., unfilled thermoplastics having good ductility). In some embodiments, the plastic sheet can be an integral part of the spring (i.e., non-detachable from the spring), e.g., made of same material. In other embodiments, it can be designed as a separate component (e.g., that can be located in operational communication with the spring (such as attached to the spring)). Optionally, the plastic element can be detachable from the spring and configured to plastically deform before the spring plastically deforms. Hence, when the impact is only sufficient to plastically deform the element, the plastic element can be detached and replaced, e.g., without requiring replacement of the spring. The size of the plastic element is dependent upon the desired plastic deformation characteristics and material used. In various embodiments, the thickness of the plastic element can be up to about 4 millimeters (mm) or so, e.g., 0.5 mm to 4 mm.

Figure 14:
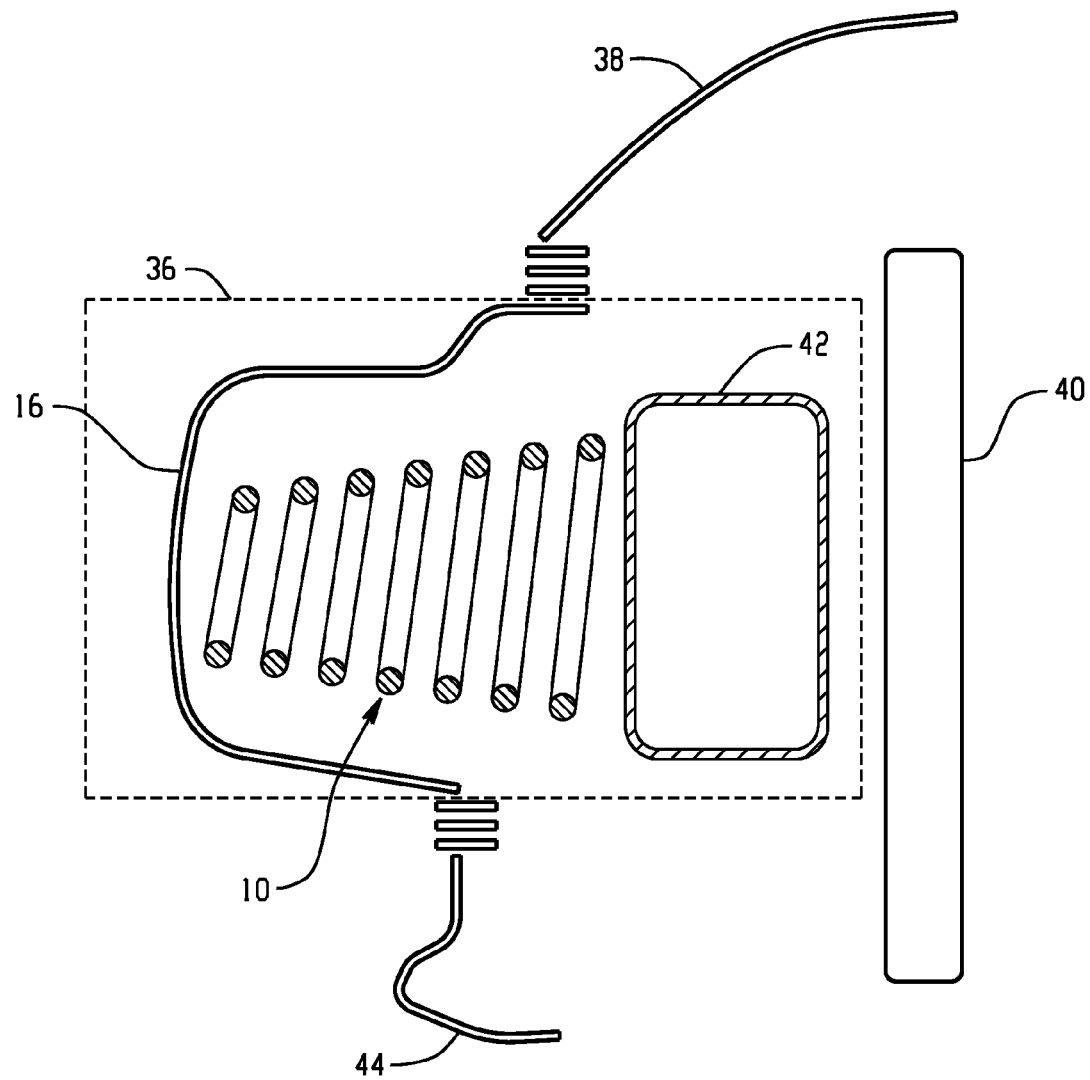
FIG. 14 is a side view of a complete energy absorber system, e.g., a bumper assembly.

FIG. 14 illustrates one embodiment of a bumper assembly (36). In FIG. 14, a spring (10) (e.g., a coil spring) is attached to a bumper beam (42) which is located in front of a radiator (40). A fascia (16) encloses the spring (10) and bumper beam (42) where the fascia (16) is located between a hood (38) and an undercarriage (44). The spring (10) is located between a support structure (i.e., the bumper beam (42)) and the fascia (16) and is configured to compress upon application of energy to the fascia (16). Upon the application of force to the fascia (16), the spring (10) compresses and experiences plastic deformation such that when the force ceases, the spring (10) is locked into place and does not spring back (i.e., the spring does not return back to its original shape before compression). Depending upon the amount of force and the design of the spring, the plastic deformation can inhibit a portion or all of the elastic action of the spring). For example, in some embodiments, the spring remains partially compressed, only returning to less than or equal to 80% of its original height, "h", specifically, less than or equal to 65% of its original height, more specifically less than or equal to 50% of its original height, and yet more specifically, less than or equal to 25% of its original height. In some embodiments, the spring can remain fully compressed. In some embodiments, however, when the force is less than that needed to plastically deform the particular spring, when the force ceases, the spring returns to its original shape (e.g., to greater than or equal to 95% of its original height, "h").

Figure 16:
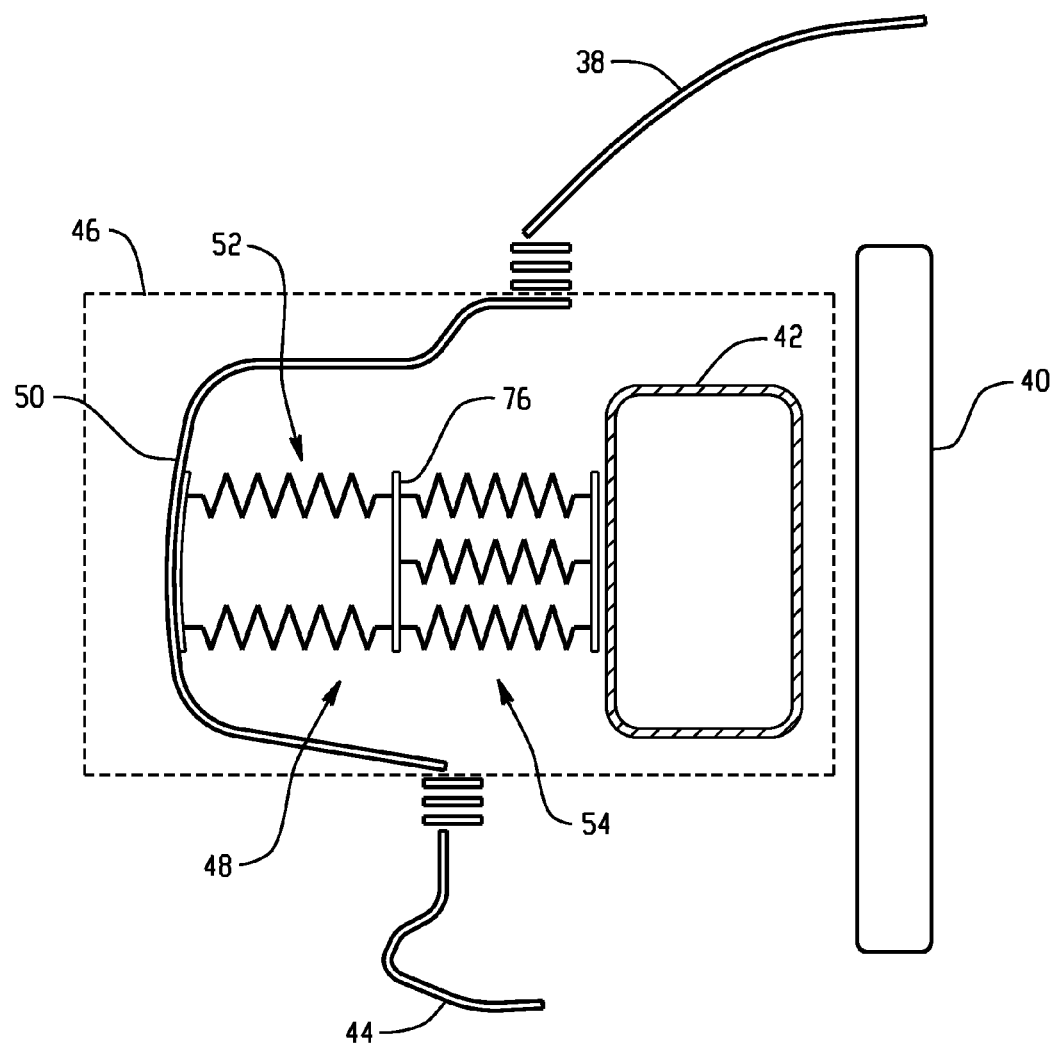
FIG. 16 is a side view of a multi-stage energy absorber.

FIG. 16 illustrates one embodiment of a multistage, plastic spring, bumper assembly (46). In FIG. 16, a plurality of springs (48) is illustrated as attached to a bumper beam (42) which is located in front of a radiator (40). A fascia (e.g., a cover plate) (50) surrounds the plurality of springs (48) and bumper beam (42) where the fascia (50) is located between a hood (38) and an undercarriage (44). The plurality of springs (48) is located between a support structure (42) and the fascia (50) and is configured to compress upon the application of energy to the fascia (50). In the illustrated embodiment, the plurality of springs (48) is arranged in series and in parallel for multi-stage energy absorption. A first set of springs (52) is located between the fascia (50) and the support structure (76), while a second set of springs (54) is located between the support structure (76) and the bumper beam (42). It is understood that although two sets of springs are illustrated in series, the assembly can comprise one or more sets of springs (e.g., greater than or equal to 2 sets of springs, specifically, greater than or equal to 3 sets of springs) arranged in series, between the fascia and a support structure (e.g., the bumper beam), with support structures located between each set of springs. Each set of springs can have the same or a different compressibility (e.g., stiffness) than any other set of springs.

Upon application of energy to the fascia (50), the springs (10) will begin to compress. The stages can be designed to compress simultaneously, or sequentially. In some embodiments, for example, the first set of springs (52) will begin to compress and after a certain threshold compression, the second set of springs (54) will begin to compress. For example, the second set of springs (54) can begin to compress when the first set of springs (52) has compressed to less than or equal to 25% of their original height (h), specifically, less than or equal to 40%, more specifically, less than or equal to 50%, yet more specifically, less than or equal to 75%, still more specifically, less than or equal to 80%, even more specifically, less than or equal to 90%, and even, less than or equal to 95%, of their original height (h).

Figure 17:
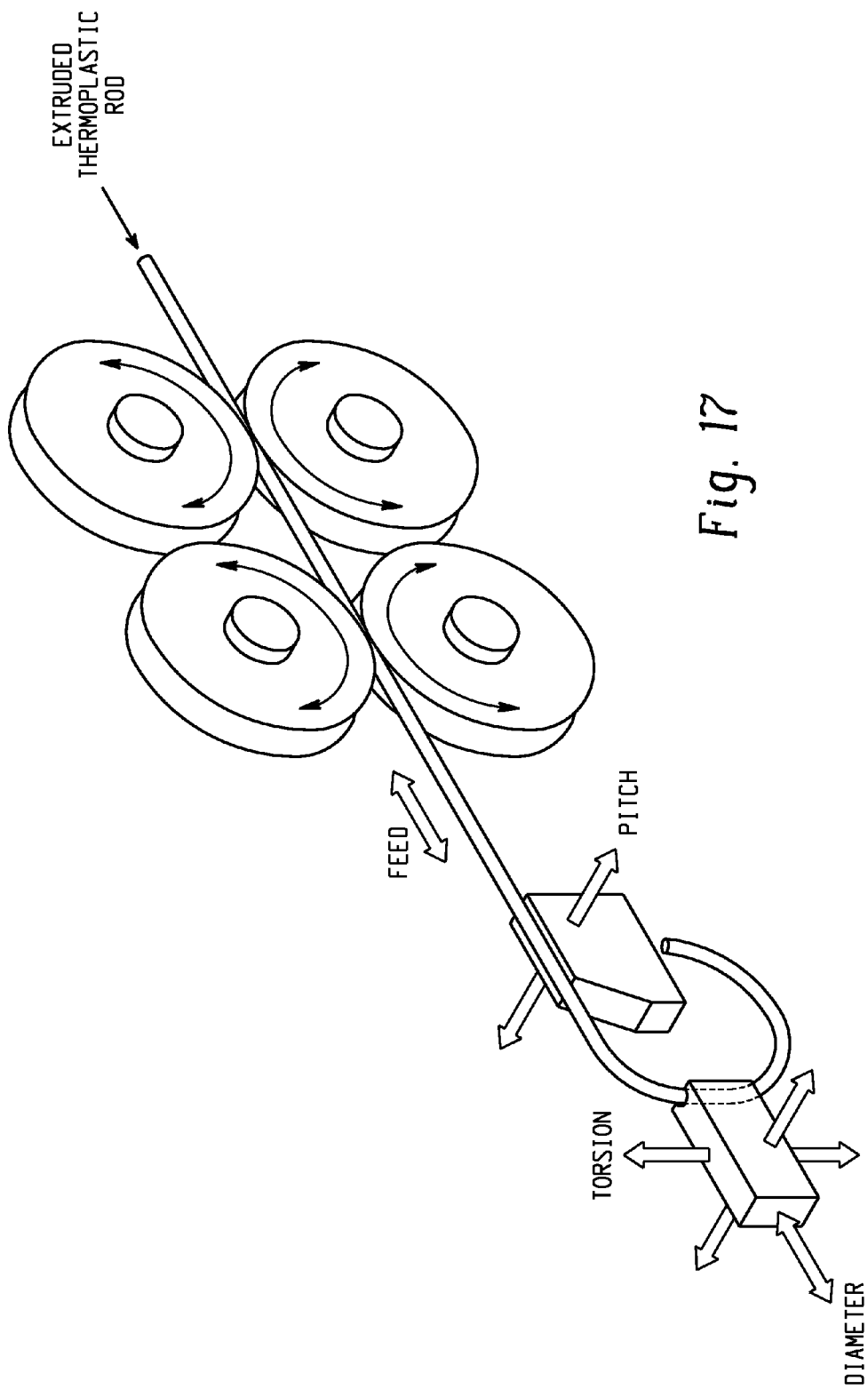
FIG. 17 is a front view of a winding process for use in producing a coil spring.

The coil springs (10) as disclosed herein can be manufactured via any process suitable for processing thermoplastic materials. For example, the plastic material can be extruded into a shape (e.g., a rod, cylinder, tube, roll, etc.). In one embodiment, the thermoplastic rod can be wound around a cylinder (e.g., a steel cylinder), to produce the coil springs described herein. For example, the diameter of rod can be controlled during extrusion process using different dies, the overall diameter of the spring can be fixed on the steel mandrel diameter, and the pitch of the spring can be tuned during winding process changing the speed of coil winding. The coil springs (10) can be processed by hot winding (e.g., FIG. 17), cold winding, as well as other processes. The conical helical coils can also be manufactured by injection molding process.

The winding process includes less tooling cost compared to injection molding process, while the injection molding process is more suitable for mass production.

The arrangement of springs over the support structure (i.e., the spring layout) plays a role in tuning the stiffness profile of a bumper system. Springs arranged in close proximity to each other offer higher stiffness to the bumper system than the same type of springs (e.g., same shape, size, etc.) arranged far apart from each other. The appropriate spacing between springs can be identified such that enough support can be offered to a lower leg impactor for impact at locations between the springs. Spacing between sets of springs in the vertical direction can be tuned according to the vehicle height and knee location of the lower leg from the ground. The position of each spring in the layout can be fixed for tuning the bumper stiffness locally (i.e., at each individual vehicle assembly plant). An optimum layout can vary from vehicle to vehicle, depending on vehicle bumper parameters (e.g., the layout can vary depending on the type of vehicle used; the layout can vary if the vehicle is a small, compact vehicle, versus a larger sport utility vehicle). Springs can be arranged close enough to offer support to the legform hit at an intermediate location between the springs. They can also be sufficiently spaced to minimize mass.

Different combinations of spring arrangements (e.g., in series and in parallel as illustrated in FIG. 16) can help achieve multistage energy absorption behavior. For example, consider FIG. 16, which illustrates an example where dual stage energy absorption can be achieved by using a set of softer springs in a first stage (52) and a second set of stiffer springs in a second stage (54). The first stage springs (52) and second stage springs (54) can be separated with the help of a spacer or plate (e.g., support structure (76)) based on vehicle bumper parameters and the need to meet impact requirements of different geographic locations, an optimum combination/arrangement can vary from vehicle to vehicle.

The plastic spring energy absorber is further illustrated by the following non-limiting examples.

EXAMPLES

Testing Procedures

The following results were obtained using computer aided engineering (CAE) methodology.

The coil spring energy absorber system is validated over a generic vehicle platform. First, a set of plastic springs are mounted over an upper cross-car beam and a second set of plastic springs are mounted over a bumper beam. All the components of the vehicle front bumper system up to the A-Pillar are considered in the CAE model (e.g., the fascia, grille, hood, fenders, headlamps, beam, undertray, radiator assembly, etc.).

The vehicle bumper system incorporating a plurality of helical conical plastic springs is impacted with a commercially available lower leg model and a knee acceleration model, i.e., G-load in units of gravity (g), knee bending (i.e. rotation in degrees (deg)), and tibia shear in millimeters (mm) are estimated by CAE model using LS-DYNA software (commercially available from Livermore Software Technology Corp, California).

The vehicle bumper system incorporating sets of helical conical plastic springs is impacted with a commercially available upper leg model and the maximum force, measured in kiloNewtons (kN), and the maximum bending movement measured in Newton meters (N·m) are estimated for the upper leg model, which is a CAE model developed by Ove Arup & Partners, Coventry, UK Comparative Example 1

Figure 13:
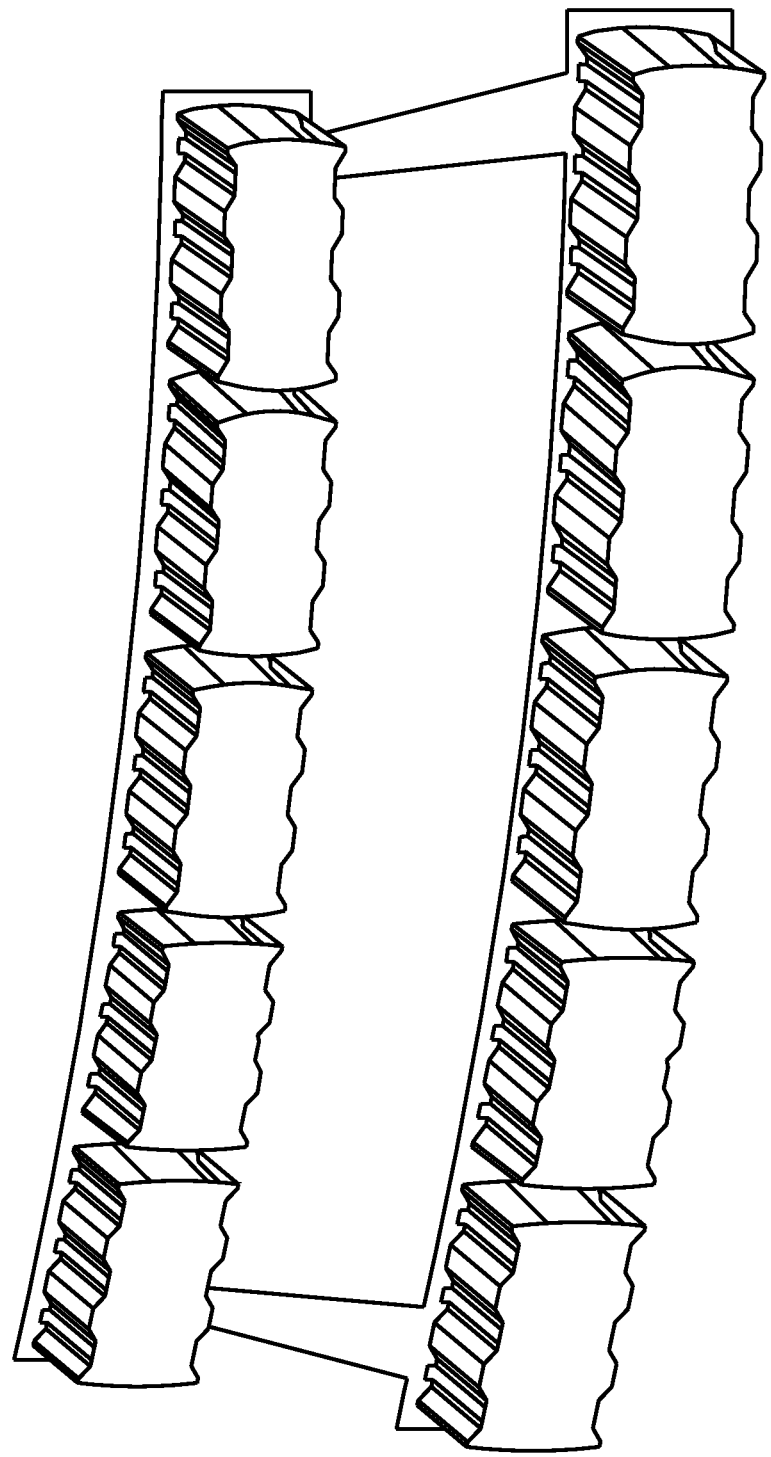
FIG. 13 is an embodiment of a thermoplastic energy absorber system comprising a C-section geometric configuration instead of compression springs.

Comparative Example 1 is an energy absorber design as illustrated in FIG. 13 comprising energy absorbing elements. This design is a variant of thermoplastic energy absorbers with a C-section geometry comprising XENOY®, a thermoplastic material comprising polycarbonate and polybutylene terephthalate, commercially available from SABIC Innovative Plastics. The support structures, upper cross-car beam, and bumper beam designs are the same as for those described for mounting in Example 1. The performance numbers for lower leg impact and upper leg impact are estimated using the same methodology as described with respect to Example 1.

Comparative example 1 is an optimum C-section energy absorber design, made of XENOY® thermoplastic material, designed for minimum possible mass through injection molding process, meeting lower leg impact Phase-II targets. The energy absorber was mounted on the same support structure as used for Example 1. The conventional energy absorber was also designed to meet Phase-II targets. Thus the comparison was between two designs developed to meet Phase-II targets for same vehicle platform.

Example 1

Example 1 is an energy absorber design comprising conical, helical, plastic springs disposed across a steel bumper beam as illustrated in FIG. 7. The springs had a diameter at their base of 80 mm, a diameter at the top of 25 mm, a coil diameter of 15 mm, and a depth (e.g., height from the base to the top) of 80 mm. The springs were formed from a blend of polycarbonate and polybutylene terephthalate (e.g., XENOY® commercially available from SABIC Innovative Plastics).

TABLE 1

| Examples | Impact (at Y = 0) | Mass (kg) | G-load (g) | Rotation (deg.) | Sheer (mm) | Max. Force (kN) | Bending Movement (N · m) |
|---|---|---|---|---|---|---|---|
| Comp. Ex. 1 | Lower Leg | 2.0 | 110.6 | 2.2 | 4.8 | — | — |
| Ex. 1 | Lower Leg | 1.5 | 94.8 | <1 | 1.7 | — | — |
| Comp. Ex. 1 | Upper Leg | 2.0 | — | — | — | 6.84 | 333.9 |
| Ex. 1 | Upper Leg | 1.5 | — | — | — | 4.87 | 268.2 |

The results comparing the thermoplastic energy absorber (Comp. Ex. 1) to the plastic spring design (Ex. 1) are set forth in Table 1. As is clear from Table 1, the use of the helical spring enabled, for the upper leg, a reduction in bending movement of greater than 50 Newton-meters (N·m), and a reduction in force of nearly 2 kiloNewtons (kN) (i.e., the thermoplastic energy absorber exhibited 40% more force and nearly 25% more bending movement). With respect to the lower leg, with the springs, the G-load was reduced by more than 10 grams, the rotation was reduced by more than a degree, and the shear was reduced by more than 2 mm, as compared to the thermoplastic energy absorber. In other words, compared to the spring design, the thermoplastic energy absorber comprising a C-section geometry exhibited greater than 115% G-load, greater than 220% rotation, and greater than 280% sheer.

The designed helical conical spring energy absorber system is observed to meet the EuroNCAP lower scale values for lower leg impact requirements and to meet the EEVC WG17 Phase-II requirements for lower leg impact, i.e., G-load<150 (G (gravitational force)), knee bending<15 degrees, and tibia shear<6 mm. Also, the performance numbers are observed to be within the lower limit of the EuroNCAP scale for upper leg impact requirements (i.e., 150 (G), 15 degrees, and 6 mm), and within the EEVC WG17 Phase-II requirements for upper leg impact, i.e., Force of less than 5 kN (kiloNewtons) and Bending moment of less than 300 Nmm (Newton millimeters).

Example 2

Figure 15:
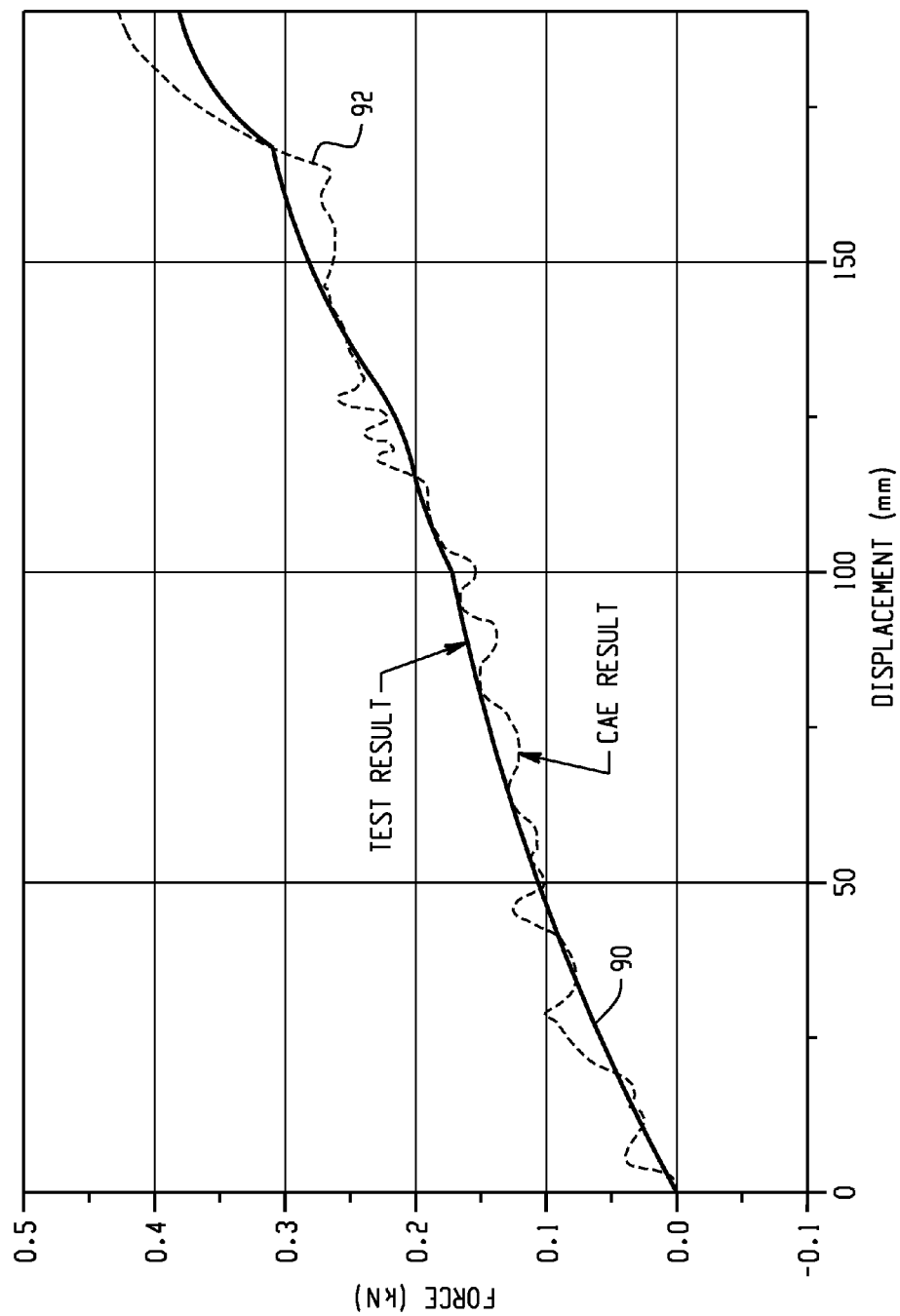
FIG. 15 illustrates graphical results of a plastic compression spring tested for static compression versus a CAE simulation.

Prototype samples were prepared to validate the CAE studies. From these prototypes, component level tests were conducted. Commercially available polypropylene material was used to develop prototype samples. The polypropylene rods were heated below the melt temperature, and winded over a wooden mandrel manually to form helical conical coils. A compression test was performed in a Universal testing Machine (UTM) and a force versus deformation curve was compared with the CAE studies of compression phenomenon in Example 1 and Comparative Example 1 utilizing the same parameters. FIG. 15 displays a descent correlation between the CAE examples, line 92 (Comparative Example 1 and Example 1) and Example 2, line 90. A simple compression test was performed for developed coils using a UTM. One end of the coil was fixed with the help of jaws, and the coil was compress at the free end by a steel plate moving with a speed of 6 millimeters per minute (mm/min.). The same test procedure was replicated in a CAE where one end was constrained and at the free end was compressed by a rigid plate moving with a speed 6 mm/min. The results shown in FIG. 15 increase the confidence on CAE simulations conducted for system level studies for lower leg and upper leg impact cases.

The energy management systems disclosed herein enable novel geometric configurations (e.g., of bumper assemblies), material and processing, while able to achieve multi-stage energy absorption. The flexibility to tune elastic and plastic deformation of the springs gives an edge over other energy absorbers and over metal springs. These systems enable a reduction in system mass and material cost, a reduction in tooling cost, and an efficient energy management in minimum space. Although these springs could be used with shell wall structures (e.g., such as illustrated in FIG. 13), they can be used independently, replacing the shell wall structure, thereby reducing mass. Furthermore, they can be tuned to enhance vibration stability of the fascia.

In one embodiment, an energy management system can comprise: support structure(s) (e.g., a vehicle support structure); a fascia; and a plastically deformable compression spring(s) located between the support structure and the fascia. In another embodiment, an energy management system can comprise: support structure(s) (e.g., in a vehicle); a covering(s); and plastically deformable compression spring(s) located between the support structure(s) and the covering(s). A method of absorbing energy can comprise: impacting a portion of a vehicle comprising the energy management system (e.g., on a fascia of a vehicle bumper system) and compressing and plastically deforming the compression spring(s) to form compressed spring(s). A method for energy management in a vehicle can comprise: installing an energy management system in a vehicle.

In the various embodiments: (i) the support structure (e.g. a metal bumper beam, metal plate, steering column, etc.) can have sufficient structural integrity to enable the compression spring(s) to fully compress; (ii) the covering can be the outer most element of the energy absorber system (e.g., such that there is no additional structural component between the compression spring(s) and the object impacted (e.g., person, other vehicle, etc.)); (iii) the covering can be a fascia; (iv) the spring can have a conical geometry such that a first coil is adjacent to a second coil and the first coil has an outer diameter that is less than or equal to an inner diameter of the second coil; (v) the spring can be connected to the support structure; (vi) the energy absorber system can comprise sets of springs (e.g., arranged in series); (vii) the support structure can be a bumper beam comprising an upper beam portion and a lower beam portion, and wherein a first plurality of compression springs can be located on the upper beam portion and a second plurality of compression springs can be located on the lower beam portion; (viii) the support structure can be selected from the group consisting of a bumper beam, a front-end module, a radiator support beam, bumper support brackets, a component projecting from body in white, and combinations comprising at least one of the foregoing; (ix) the compression spring(s) can be located on the support structure; (x) the springs can have a stiffness of 0.01 kiloNewtons per millimeter to 10 kiloNewtons per millimeter; (xi) the spring(s) can have a conical geometry that diverges toward the support structure; (xii) the spring(s) can be attached to the fascia; (xiii) spring(s) can be attached to the fascia and other spring(s) can be attached to the support structure; (xiv) the spring(s) can comprises a material selected from the group consisting of a thermoplastic, a thermoplastic composite, and combinations comprising at least one of the foregoing; (xv) the spring(s) can further comprises a metal core (e.g., some can comprise a metal core, some can be a single material, and/or some can have a void in the core (e.g., be hollow)); (xvi) the spring material can comprise a thermoplastic and a metal; (xvii) the spring(s) can be thermoplastic with a metal core; (xviii) the spring(s) can have a combination of thermoplastic coils and metal coils; (xix) an inner diameter of the spring(s) can be a void; (xx) the compression spring(s) can have a percent plastic deformation upon impact of greater than or equal to 10%, specifically, greater than or equal to 15%, more specifically, greater than or equal to 20%, yet more specifically, greater than or equal to 50% (e.g., 15% to 40%); (xxi) the compression spring(s) can be removably attached to the support structure and/or covering.

In the various embodiments: (i) the spring(s) can comprise locking element(s) that will inhibit the spring(s) from returning to its original position after compression (e.g., the locking element(s) can be plastically deformable and/or can mechanically restrain the spring(s)); (ii) the locking element(s) can have a percent plastic deformation upon impact of greater than or equal to 20%, specifically, greater than or equal to 40%, more specifically, greater than or equal to 75%); (iii) the locking element(s) can comprise a non-metallic element (e.g., a plastic element) in operational communication with the spring(s); (iv) the locking element(s) can be configured (e.g., designed and located) to mechanically restrain the spring(s) after the energy absorber system has been impacted; and/or (v) the locking element(s) can comprise a material selected from the group consisting of polycarbonate, polybutylene terephalate, polypropylene, acrylonitrile-butadiene-styrene, polyester, acrylic-styrene-acrylonitrile, polyethylene terephthalate, polyamides, polyethylene, and combinations comprising at least one of the foregoing.

The various methods can further comprise: (i) mechanically restraining the compressed spring; (ii) replacing the compressed spring while not replacing the support structure;

and/or (iii) plastically deforming different springs in the energy management system by a different percent plastic deformation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A vehicle energy management system, comprising:
a support structure selected from a bumper beam, a body in white, a body in black, a front-end module, a radiator support beam, a bumper support bracket, a component projecting from the body in white, a component projecting from the body in black, and combinations comprising at least one of the foregoing;
a covering; and
a coil energy absorber made of plastic, wherein the coil energy absorber has an initial height and is located between the support structure and the covering, and wherein the coil energy absorber absorbs energy upon impact such that, after the impact, the coil energy absorber has a final height that is less than or equal to 90% of the initial height.

2. The energy management system of claim 1, wherein final height that is less than or equal to 50% of the initial height.

3. The energy management system of claim 2, wherein final height that is 0 to 40% of the initial height.

4. The energy management system of claim 3, wherein final height that is 0 to 25% of the initial height.

5. The energy management system of claim 1, wherein the coil energy absorber has a conical geometry such that a first coil is adjacent to a second coil and the first coil has an outer diameter that is less than or equal to an inner diameter of the second coil.

6. The energy management system of claim 1, comprising sets of coil energy absorbers arranged in series.

7. The energy management system of claim 1, wherein the support structure is a bumper beam comprising an upper beam portion and a lower beam portion, and
wherein a first portion of the plurality of coil energy absorbers are located on the upper beam portion and a second portion of the plurality of coil energy absorbers are located on the lower beam portion.

8. The energy management system of claim 1, wherein the coil energy absorber is removably attached to the support structure and/or covering.

9. The energy management system of claim 1, wherein the coil energy absorber is configured to have a stiffness of 0.01 kiloNewtons per millimeter to 10 kiloNewtons per millimeter.

10. The energy management system of claim 1, wherein the coil energy absorber has a conical geometry that diverges toward the support structure.

11. The energy management system of claim 1, wherein the coil energy absorber is attached to the covering.

12. The energy management system of claim 1, wherein the plastic is selected from the group consisting of a thermoplastic and a thermoplastic composite.

13. The energy management system of claim 1, wherein the coil energy absorber further comprises a metal core.

14. The energy management system of claim 1, wherein, energy management system, meets EEVC WG17 Phase-II for upper leg impact of a force of less than 5 kN and a bending moment of less than 300 N·mm.

15. The energy management system of claim 1, wherein, there is no additional structural component between the compression spring(s) and the object impacted.

16. The energy management system of claim 1, wherein, the covering can be the outer most element of the energy absorber system.

17. The energy management system of claim 1, wherein the covering is a decorative element that covers the coil energy absorber.

18. The energy management system of claim 17, wherein the coil energy absorber are directly behind the covering.

* * * * *